United States Patent [19]

Rodgers et al.

[11] Patent Number: 5,746,391
[45] Date of Patent: May 5, 1998

[54] MOUNTING FOR COUPLING A TURBOFAN GAS TURBINE ENGINE TO AN AIRCRAFT STRUCTURE

[75] Inventors: Leonard J. Rodgers; Arnold C. Newton; James P. Berry; Peter G. G. Farrar, all of Derby; Kenneth F. Udall, Derbyshire, all of England

[73] Assignee: Rolls-Royce plc, London, England

[21] Appl. No.: 625,356

[22] Filed: Apr. 1, 1996

[51] Int. Cl.$^6$ .............................. F02C 7/20; B64D 27/12
[52] U.S. Cl. ........................ 244/54; 248/555; 248/556; 60/39.31
[58] Field of Search ...................... 248/554, 900, 248/557, 555, 556; 60/39.31; 244/53, 54

[56] References Cited

U.S. PATENT DOCUMENTS

| | | | |
|---|---|---|---|
| 1,581,539 | 4/1926 | Kauch et al. | 244/54 |
| 2,053,078 | 8/1936 | Hathorn | 244/54 |
| 2,147,516 | 2/1939 | Birkigt | 248/557 |
| 2,249,194 | 7/1941 | Trott | 248/557 |
| 2,539,960 | 1/1951 | Marchant et al. | 60/39.31 |
| 2,987,271 | 6/1961 | Heath et al. | 244/54 |
| 5,190,245 | 3/1993 | Debeneix | 244/54 |

FOREIGN PATENT DOCUMENTS

| | | | |
|---|---|---|---|
| 0115914 | 8/1984 | European Pat. Off. | 244/54 |
| 841320 | 7/1960 | United Kingdom . | |
| 1270538 | 4/1972 | United Kingdom . | |
| 2275308 | 8/1994 | United Kingdom . | |

Primary Examiner—Virna Lissi Mojica
Attorney, Agent, or Firm—Cushman Darby & Cushman Intellectual Property Group of Pillsbury Madison & Sutro LLP

[57] ABSTRACT

A mounting for connecting a turbofan gas turbine engine to an aircraft structure comprises three mounting points at the vertices of a triangle on the aircraft structure and three mounting points on the fan casing of the turbofan gas turbine engine. The first mounting point on the aircraft structure is connected to all of the three mounting points on the fan casing by three links. The second mounting point on the aircraft structure is connected to the second mounting point and the third mounting point on the fan casing by two links. The third mounting point on the aircraft structure is connected to the second mounting point and the third mounting point by two links. The links provide an open spaceframe which defines the structure of a pylon. The mounting has reduced weight compared to conventional mountings and is cheaper to manufacture.

31 Claims, 5 Drawing Sheets

MOUNTING FOR COUPLING A TURBOFAN GAS TURBINE ENGINE TO AN AIRCRAFT STRUCTURE

FIELD OF THE INVENTION

The present invention relates to a mounting for coupling a turbofan gas turbine engine to an aircraft structure.

BACKGROUND OF THE INVENTION

Conventional mountings for high bypass ratio turbofan gas turbine engines are relatively heavy and relatively costly to produce.

The present invention seeks to provide a mounting for coupling a turbofan gas turbine engine to an aircraft structure which has relatively high stiffness, which has a relatively low weight and is relatively cheap to produce.

SUMMARY OF THE INVENTION

Accordingly the present invention provides a mounting for coupling a turbofan gas turbine engine to an aircraft structure, the turbofan gas turbine engine having an axis and comprising a core engine and a fan, the core engine having compressor means, combustor means, turbine means and a core casing, the fan operating within a fan duct defined in part by a fan casing, the fan casing extending from a fan duct intake to a fan duct nozzle, the aircraft structure having three mounting points on, or secured to, the aircraft structure, the three mounting points being arranged at the vertices of a first triangle, the fan casing having three mounting points arranged at the vertices of a second triangle, support means connecting the three mounting points on the fan casing with the core casing to support the core engine, first connecting means connecting a first one of the mounting points on the aircraft structure with the three mounting points on the fan casing, second connecting means connecting a second one of the mounting points on the aircraft structure with two of the mounting points on the fan casing, and third connecting means connecting a third one of the mounting points on the aircraft structure with at least one of the mounting points on the fan casing.

Preferably the three mounting points on the aircraft structure are arranged in a first plane, the fan casing having a first mounting point in a second plane, the second plane being arranged perpendicular to the axis of the turbofan gas turbine engine, the fan casing having a second mounting point and a third mounting point in a third plane, the third plane being arranged perpendicular to the axis of the gas turbine engine, the third plane being spaced axially from the second plane, the second and third mounting points being angularly spaced on the fan casing such that the three mounting points on the fan casing are arranged at the vertices of the second triangle, the second connecting means connecting a second one of the mounting points on the aircraft structure with the second and third mounting points on the fan casing, the third connecting means connecting a third one of the mounting points on the aircraft structure with at least one of the second or third connecting points on the fan casing.

Preferably the first plane contains the axis of the turbofan gas turbine engine, the first mounting point is arranged in the first plane, the second and third mounting points are angularly spaced on either side of the first plane.

Preferably the third plane is arranged axially downstream of the second plane.

Preferably the first connecting means comprises a first link connecting the first mounting point on the aircraft structure with the first mounting point on the fan casing, a second link connecting the first mounting point on the aircraft structure with the second mounting point on the fan casing and a third link connecting the first mounting point on the aircraft structure with the third mounting point on the fan casing.

Preferably the second connecting means comprises a fourth link connecting the second mounting point on the aircraft structure with the second mounting point on the fan casing and a fifth link connecting the second mounting point on the aircraft structure with the third mounting point on the fan casing.

Preferably the third connecting means comprises a sixth link connecting the third mounting point on the aircraft structure with the second mounting point on the fan casing.

Preferably the third connecting means comprises a seventh link connecting the third mounting point on the aircraft structure with the third mounting point on the fan casing.

Preferably the fan casing has a fourth point and a fifth point arranged in the second plane, the first mounting point, the fourth point and the fifth point are angularly spaced apart on the fan casing at the vertices of a third triangle, the fan casing has a sixth point arranged in the third plane, the second mounting point, the third mounting point and the sixth point are angularly spaced apart on the fan casing at the vertices of a fourth triangle, fourth connecting means connecting the first mounting point with the second mounting point and the third mounting point, fifth connecting means connecting the fourth point with the second mounting point and the sixth point, sixth connecting means connecting the fifth point with the third mounting point and the sixth point.

Preferably the fourth connecting means comprises an eighth link connecting the first mounting point with the second mounting point and a ninth link connecting the first mounting point with the third mounting point.

Preferably the fifth connecting means comprises a tenth link connecting the fourth point with the second mounting point and an eleventh link connecting the fourth point with the sixth point.

Preferably the sixth connecting means comprises a twelfth link connecting the fifth point with the third mounting point and a thirteenth link connecting the fifth point with the sixth point.

Preferably the first mounting point, the fourth point and the fifth point are spaced apart by 120° to form an equilateral triangle.

Preferably the second mounting point, the third mounting point and the sixth point are spaced apart by 120° to form an equilateral triangle.

Preferably the points in the second plane are angled by 60° relative to the points in the third plane.

Preferably the first link comprises means to control the length of the first link to vary the pitch angle of the turbofan gas turbine engine relative to the aircraft structure.

Preferably the means to control the length of the first link comprises a hydraulic ram, an electric ram or a pneumatic ram.

Preferably the fourth link comprises means to control the length of the fourth link to vary the yaw angle of the turbofan gas turbine engine relative to the aircraft structure.

Preferably the means to control the length of the fourth link comprises a hydraulic ram, an electric ram or a pneumatic ram.

Preferably the eighth link, the ninth link, the tenth link, the eleventh link, the twelfth link and the thirteenth link each comprise means to control the length of the respective link to rotate, or translate, an upstream portion of the fan casing to vary tip clearance between the fan and the fan duct.

Preferably each of the links comprises a hollow tube.

Preferably each hollow tube comprises a plurality of fibres braided and arranged in a matrix material. Preferably the fibres are carbon fibres.

Alternatively each hollow tube comprises a metal matrix composite.

The support means may comprise a plurality of radially extending spokes arranged in the second plane connecting the first mounting point on the fan casing and the core casing and a plurality of A-frames arranged in the third plane connecting the second and third mounting points on the fan casing and the core casing.

BRIEF DESCRIPTION OF THE DRAWINGS

The present invention will be more fully described by way of examples with reference to the accompanying drawings, in which.

DETAILED DESCRIPTION OF THE INVENTION

Figure 1:
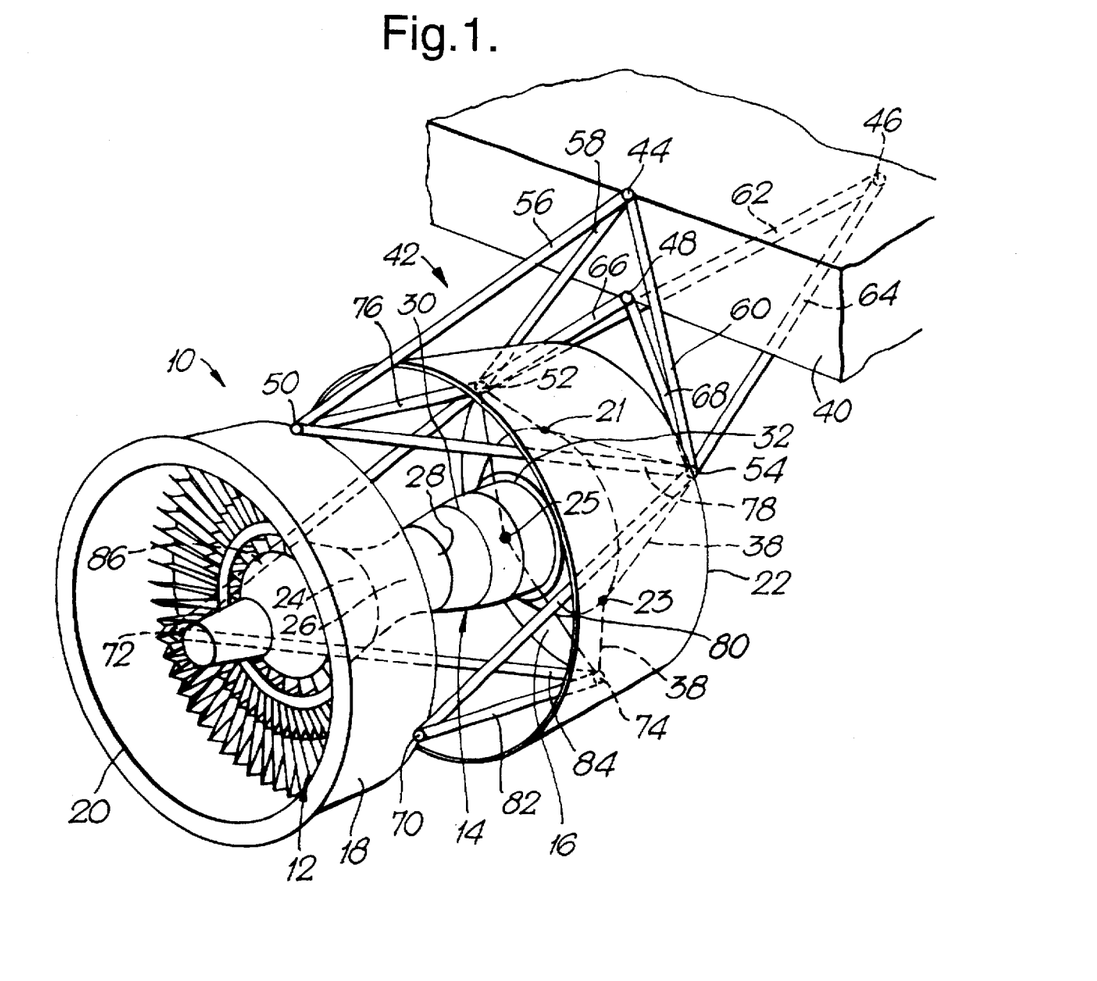
FIG. 1 is a perspective view of a turbofan gas turbine engine having a mounting according to the present invention.
Figure 2:
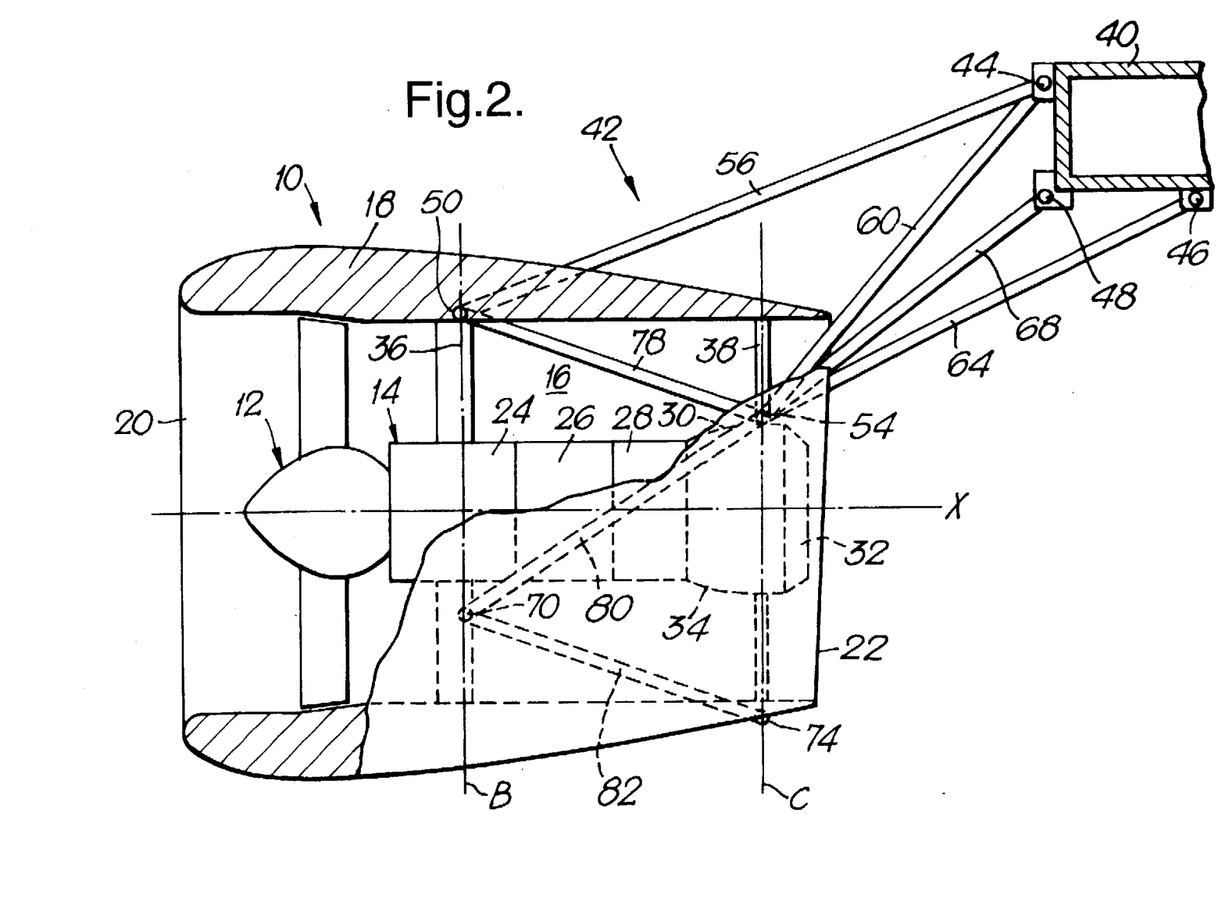
FIG. 2 is a part cross-sectional view through the turbofan gas turbine engine shown in FIG. 1.

A high bypass ratio turbofan gas turbine engine 10 is shown in FIGS. 1 and 2, and comprises a fan assembly 12 and a core engine 14. The fan assembly 12, not shown in FIG. 1, is positioned upstream of the core engine 14. The fan assembly 12 is arranged in a fan duct 16 defined in part by a fan casing 18, the fan duct 16 has an inlet 20 at its upstream end and a nozzle 22 at its downstream end. The fan casing 18 extends from the inlet 20 to the nozzle 22.

The core engine 14 comprises in axial flow series an intermediate pressure compressor 24, a high pressure compressor 26, a combustor means 28, a turbine means 30 and a nozzle 32. A portion of the air initially compressed by the fan assembly 12 flows through the intermediate and high pressure compressors 24,26 to the combustor means 28, which may be an annular combustor or a can-annular combustor. Fuel is burnt in the combustor means 28 to produce hot gases which flow through the turbine means 30. The turbine means 30 drives the fan assembly 12, intermediate pressure compressor 24 and high pressure compressor 26 via respective shafts (not shown). The air driven through the nozzle 22 by the fan assembly 12 provides the majority of the thrust. The core engine 14 is enclosed by a core engine casing 34.

The fan casing 18 is interconnected to the core engine casing 34 at an upstream position by a plurality of angularly spaced radially extending spokes 36, in this case outlet guide vanes, which are positioned downstream of the fan assembly 12. The fan casing 18 is also interconnected to the core engine casing 34 at a downstream position by three angularly spaced A-frames 38 which are positioned adjacent the turbine nozzle 32. The A-frames 38 are connected to the turbine rear frame (not shown) The spokes 36 and the A-frames 38 support the core engine 14 from the fan casing 18. The spokes 36 provide the thrust link from the core engine 14 to the fan casing 18.

The high bypass ratio turbofan gas turbine engine 10 is mounted onto an aircraft wing box, or stub pylon extension, 40 by a mounting to be described below.

The mounting 42 comprises three mounting points, i.e. brackets, 44, 46 and 48 on the aircraft structure 40. The three mounting points 44, 46 and 48 are arranged at the vertices of a first triangle, and the three mounting points are arranged in a first plane A containing the axis X of the turbofan gas turbine engine 10. The turbofan gas turbine engine 10 has three mounting points 50, 52 and 54 on the fan casing 18. The first mounting point 50 is located in a second plane B, which is arranged perpendicular to the axis X of the turbofan gas turbine engine 10. The first mounting point 50 is also located in the first plane A. The second mounting point 52 and the third mounting point 54 are located in a third plane C, which is arranged perpendicular to the axis X of the gas turbine engine 10. The second plane B is located in the plane of the spokes 36 and the third plane is located in the plane of the A-frames 38. Thus the second plane B is axially upstream of the third plane C. The second and third mounting points 52 and 54 are angularly spaced on either side of the first plane A such that the three mounting points 50, 52 and 54 on the fan casing 18 are arranged at the vertices of a second triangle. Plane A is in the plane of the paper in FIG. 2.

A first link 56 connects the first mounting point 44 on the aircraft structure 40 with the first mounting point 50 on the fan casing 18. A second link 58 connects the first mounting point 44 on the aircraft structure 40 with the second mounting point 52 on the fan casing 18 and a third link 60 connects the first mounting point 44 on the aircraft structure 40 with the third mounting point 54 on the fan casing 18.

A fourth link 62 connects the second mounting point 46 on the aircraft structure 40 with the second mounting point 52 on the fan casing 18 and a fifth link 64 connects the second mounting point 46 on the aircraft structure 40 with the third mounting point 54 on the fan casing 18.

A sixth link 66 connects the third mounting point 48 on the aircraft structure 40 with the second mounting point 52 on the fan casing 18 and a seventh link 68 connects the third mounting point 48 on the aircraft structure 40 with the third mounting point 54 on the fan casing 18.

Thus it can be seen that the turbofan gas turbine engine 10 is mounted to the aircraft structure 40 by seven links 56, 58, 60, 62, 64, 66 and 68 which produce a triangulated spaceframe. This produces a mounting 42 which has high stiffness for low internal and external deflections and which has relatively low weight and is cheaper to manufacture. The links are preferably hollow tubes, and preferably the hollow tubes are constructed from braided carbon fibres in a suitable matrix material, or from a metal matrix composite. It is possible to dispense with the link 66 as this provides a failsafe feature. Preferably the links are arranged perpendicularly and are of minimum length. The first mounting point 44 has vertical, side and pitch loads transmitted to it by the links 56, 58 and 60, the second mounting point 46 has thrust and yaw loads transmitted to it by the links 62 and 64 and the third mounting point 48 has roll loads transmitted to it by the links 66 and 68. However, as the links are arranged at compound angles, there is practically speaking a sharing of these loads. The loads in the links are axial only, hence the high specific stiffness and strength of unidirectional, or low angle braided, carbon fibres is fully utilised. It is to be noted that the ends of the links 56, 58, 60, 62, 64, 66 and 68 are connected to the mounting points by devices which allow rotation of the links i.e. universal joints. The open triangular spaceframe forms the basic structure for the pylon and additional sheet material skins, for example sheet metal skins, are secured to the spaceframe to provide the aerodynamic shape of the pylon. The open triangular spaceframe allows excellent internal pylon accessibility, this enables relocation of the turbofan gas turbine engine and aircraft accessories, for example intercoolers, and pipework, electrical cables etc. into the pylon.

The fan casing 18 has a fourth point 70 and a fifth point 72 arranged in the second plane B. The first mounting point 50, the fourth point 70 and the fifth point 72 are angularly spaced apart on the fan casing 18 at the vertices of a third triangle. The fan casing 18 has a sixth point 74 arranged in the third plane C. The second mounting point 52, the third mounting point 54 and the sixth point 74 are angularly spaced apart on the fan casing 18 at the vertices of a fourth triangle. The first mounting point 50, the fourth point 70 and the fifth point 72 are spaced apart by 120° to form an equilateral triangle in this example. The second mounting point 52, the third mounting point 54 and the sixth point 74 are spaced apart by 120° to form an equilateral triangle in this example. The points 50, 70 and 72 in the second plane are angularly rotated by 60° relative to the points 52, 54 and 74 in the third plane.

An eighth link 76 connects the first mounting point 50 with the second mounting point 52 and a ninth link 78 connects the first mounting point 50 with the third mounting point 54. A tenth link 80 connects the fourth point 70 with the second mounting point 54 and an eleventh link 82 connects the fourth point 70 with the sixth point 74. A twelfth link 84 connects the fifth point 72 with the third mounting point 54 and a thirteenth link 86 connects the fifth point 72 with the sixth point 74. It is to be noted that the ends of the links 76, 78, 80, 82, 84 and 86 are connected to the first, second and third mounting points and fourth, fifth and sixth points by devices which allow rotation of the links i.e. universal joints. The links 76, 78, 80, 82, 84 and 86 provide six degrees of freedom for the fore and aft portions of the fan casing 18.

The core engine casing 34 has three equi-angularly spaced points 21, 23 and 25 arranged in the third plane at the vertices of an equilateral triangle. The points 21, 23 and 25 are angularly rotated by 60° relative to the points 55, 54 and 74. The point 21 is connected to the second mounting point 52 and to the third mounting point 54 by the links of adjacent A-frames 38. The point 23 is connected to the third mounting point 54 and the sixth point 74 by the links of adjacent A-frames 38. Similarly the point 25 is connected to the sixth point 74 and the second mounting point 52 by the links of adjacent A-frames 38.

The mounting 42 in FIGS. 1 and 2 is a completely passive mounting.

Figure 3:
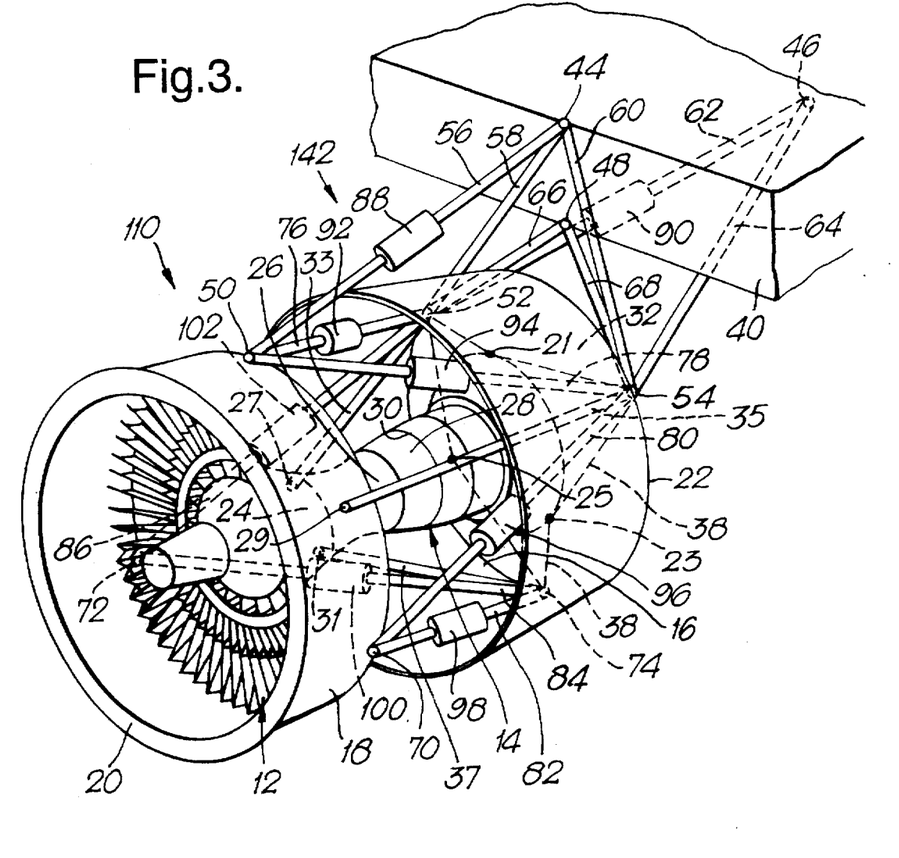
FIG. 3 is a perspective view of a turbofan gas turbine engine having an alternative mounting according to the present invention.
Figure 4:
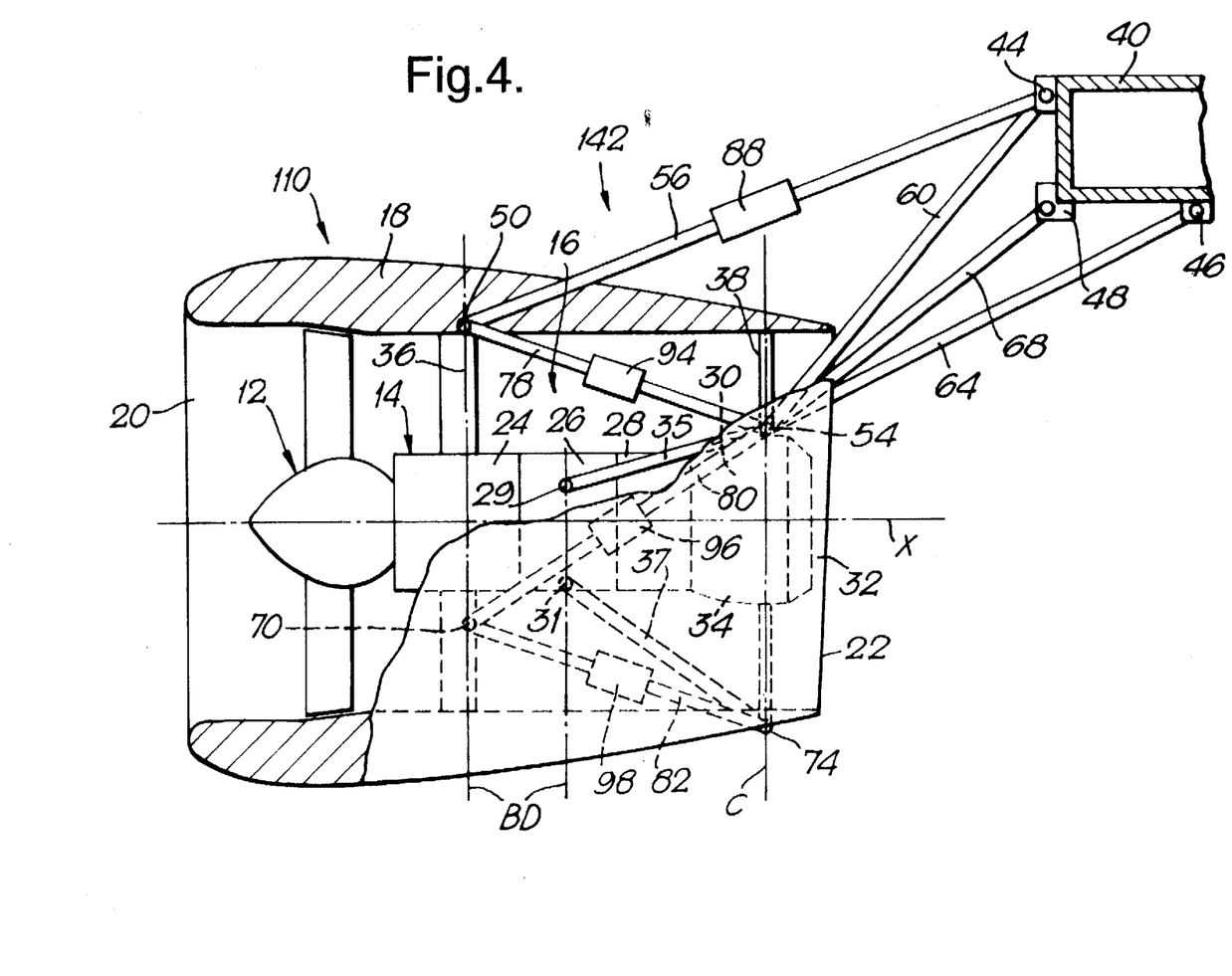
FIG. 4 is a part cross-sectional view through the turbofan gas turbine engine shown in FIG. 3.

The embodiment in FIGS. 3 and 4 is similar to that shown in FIGS. 1 and 2, but the links are different to provide an active mounting 142. The first link 56 comprises a hydraulic ram, an electric ram or a pneumatic ram, 88 to control the length of the first link 56 to vary the pitch angle of the turbofan gas turbine engine 10 relative to the aircraft structure 40. Thus the hydraulic ram 88 may be operated during take off of the aircraft as the aircraft reaches the end of the runway. This causes the intake 20 of the turbofan gas turbine engine 10 to be pitched down, and the turbofan gas turbine engine 10 rotates about the axis passing through the second and third mounting points 52 and 54 on the fan casing 18. The pitching down of the intake 20 reduces, or eliminates, intake pitch couple, fan airflow distortion and mounting loads etc. The hydraulic ram 88 may be operated in the event of a fan blade becoming detached from the fan assembly 12, and the subsequent windmilling of the fan assembly 12, to actively damp and control the turbofan gas turbine engine dynamic behaviour and load input to the aircraft structure 40. The fourth link 62 comprises a hydraulic ram, an electric ram or a pneumatic ram, 90 to control the length of the fourth link 62 to vary the yaw angle of the turbofan gas turbine engine 10 relative to the aircraft structure 40. The provision of the rams 88 and 90 has additional benefits. The hydraulic ram 88 reduces the effective intake angle of attack and allows smaller intake contraction ratios at bottom dead centre etc. The same is true for the hydraulic ram 90. This enables a larger diameter fan assembly 12 to be fitted in the same diameter of fan casing 18, enabling greater propulsive efficiency with minimal drag increase. The rams 88 and 90 may be operated to shorten the length of the links when the links are loaded in tension and to increase the length when the tension is reduced, thus the links act as if they have infinite stiffness. The rams 88 and 90 may be operated to bring failsafe load paths into operation in the event of failure of one or more links.

If the turbofan gas turbine engine is mounted on an aircraft wing, the rams may also be operated to actively control wing flutter using the turbofan gas turbine engine as ballast weight. In that instance a sensor is required to detect flutter of the aircraft wing, and a processor analyses the electrical signals produced by the sensor to determine the amount of flutter and sends signals to the rams to move the turbofan gas turbine engine so as to damp the vibration. The signals to the rams are increases or decreases in the pressure of the hydraulic or pneumatic fluid applied to the opposite sides of the piston in the ram. It is of course possible to use electrical rams.

The eighth link 76, the ninth link 78, the tenth link 80, the eleventh link 82, the twelfth link 84 and the thirteenth link 86 each comprises a respective one of the hydraulic rams, electric rams, or pneumatic rams, 92, 94, 96, 98, 100 and 102 to control the length of the respective link to rotate, or translate, the fan casing 18 to vary tip clearance between the fan 12 and the fan casing 18. Additionally the core casing 34 has three equi-angularly spaced points 27, 29 and 31 arranged in a fourth plane D at the vertices of an equilateral triangle. The fourth plane D is perpendicular to the axis X of the turbofan gas turbine engine and is located between the second and third planes B and C. The point 27 is connected to the second mounting point 52 by a first thrust link 33. The point 29 is connected to the third mounting point 54 by a second thrust link 35 and the point 31 is connected to the sixth point 74 by a third thrust link 37. The tip of the fan 12 is angled in a downstream direction and the inner surface of the fan casing 18, at this point, is conical, therefore axial movement of the fan assembly 12 varies the tip clearance. Axial movement of the fan assembly 12 is achieved by the thrust links 33, 35 and 37 connecting the core engine casing 34 to the fan casing points 52, 54 and 74, combined with the single plane attachment of the outer ends of the spokes 36 to the fan casing 18 and of the inner ends of the spokes 36 to the core engine casing 34. Lengthening rams 92 and 94 by two units and shortening rams 96, 98, 100 and 102 by one unit would pitch down the fan casing 18, producing tip clearance decrease at top dead centre and tip clearance increase at bottom dead centre. Other rotation and shear combinations are possible. In this embodiment the outer ends of the spokes 36 are free to move axially, relative to their inner ends to allow variation of fan blade tip clearance.

Figure 5:
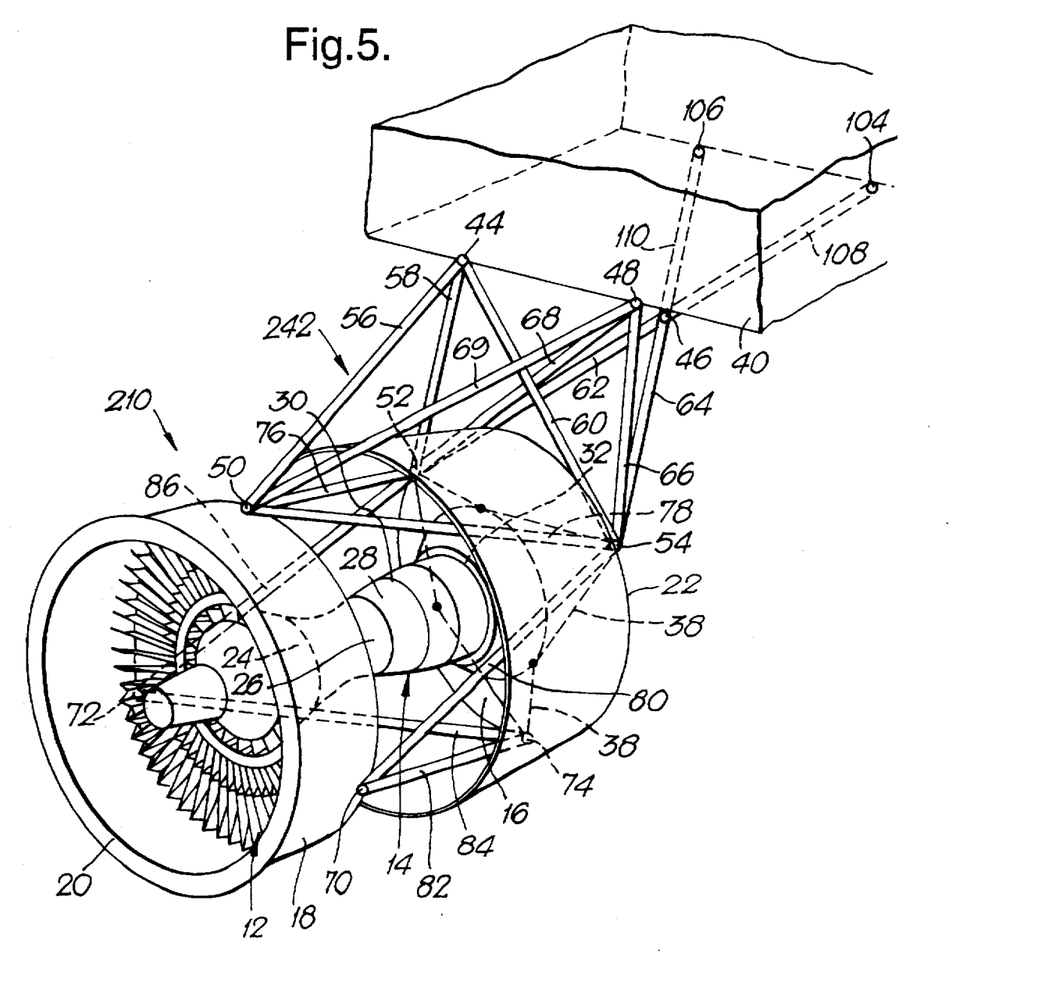
FIG. 5 is a perspective view of a turbofan gas turbine engine having a further alternative mounting according to the present invention.

The embodiment in FIG. 5 is similar to that shown in FIGS. 1 and 2, but the aircraft mounting points and links are arranged differently. The three mounting points 44, 46 and 48 are arranged at the vertices of a first triangle, and the three mounting points 44, 46 and 48 are arranged in a first plane A perpendicular to a plane containing the axis X of the turbofan gas turbine engine 210. The three mounting points 50, 52 and 54 are arranged in a similar manner to those in FIGS. 1 and 2. The first link 56 connects the first mounting point 44 on the aircraft structure 40 with the first mounting point 50 on the fan casing 18. The second link 58 connects the first mounting point 44 on the aircraft structure 40 with the second mounting point 52 on the fan casing 18 and the third link 60 connects the first mounting point 44 on the aircraft structure 40 with the third mounting point 54 on the fan casing 18.

A fourth link 62 connects the second mounting point 46 on the aircraft structure 40 with the second mounting point 52 on the fan casing 18 and a fifth link 64 connects the second mounting point 46 on the aircraft structure 40 with the third mounting point 54 on the fan casing 18. The second mounting point 46 is itself secured to two brackets 104 and 106 on the aircraft structure 40 by two links 108 and 110 respectively. It may be possible for links 62 and 108 to be integral and for links 64 and 110 to be integral, and to provide the second mounting point 46 to connect the integral links together.

A sixth link 66 connects the third mounting point 48 on the aircraft structure 40 with the second mounting point 52 on the fan casing 18, a seventh link 68 connects the third mounting point 48 on the aircraft structure 40 with the third mounting point 54 on the fan casing 18, and a further link 69 connects the third mounting point 48 on the aircraft structure 40 with the first mounting point 50 on the fan casing 18. The seventh link 68 and the additional link 69 are failsafe links and may be dispensed with if required. It is possible to interconnect links 60 and 68 where they cross so that the links are not straight in order to increase the angle the third and seventh links 60 and 68 make with the sixth and second links 66 and 58 respectively.

Thus it can be seen that the turbofan gas turbine engine 210 is mounted to the aircraft structure 40 by eight links 56, 58, 60, 62, 64, 66, 68 and 69 which produce a triangulated spaceframe. This produces a mounting 242 which has high stiffness for low internal and external deflections and which has relatively low weight and is cheaper to manufacture.

The second triangle formed by the three mounting points 50, 52 and 54 is the pylon turbofan gas turbine engine interface. Preferably the base of the second triangle i.e. the line interconnecting the second and third mounting points 52 and 54 is at the downstream end enabling roll torque to be transferred to the turbine frame. The maximum pylon width is therefore close to the base of the second triangle, and this produces a streamline gully section with an aerodynamic shape.

The invention provides a mounting for a turbofan gas turbine engine which has reduced weight compared to the conventional mountings, and also the cost of producing the mounting is reduced compared to conventional mountings.

The open spaceframe mounting allows excellent accessibility to accessories within the pylon. The use of active components in the mounting enables the reduction of intake pitch couples, fan airflow distortion, mounting loads etc.

Although the invention has described the second and third mounting points on the turbofan gas turbine engine as being downstream of the first mounting point, it may be possible in some circumstances to have them upstream of the first mounting point. In these circumstances the third plane is located in the plane of the spokes, and the second plane is in the plane of the A-frames. Although the invention has described the mounting points on the aircraft structure as being in a plane containing the axis of the turbofan gas turbine engine, it may be possible to have the mounting points on the aircraft structure in a plane perpendicular to, a plane parallel to, or a plane at other angles relative to the plane containing the axis of the turbofan gas turbine engine.

The links 76, 78, 80, 82, 84 and 86 form the structure of the fan casing 18 interconnecting the upstream portion of the fan casing 18, surrounding the fan assembly 12 upstream of, and secured to, the spokes 36 and the downstream portion of the fan casing 18 secured to the A-frames 38. The links 76, 78, 80, 82, 84 and 86 form the load bearing structure of the fan casing 18. It may be possible to use other load bearing fan casing structures but it is preferred to use the arrangement of load bearing links 76, 78, 80, 82, 84 and 86. The invention thus mounts a turbofan gas turbine engine to an aircraft structure using a triangulated spaceframe, this provides a structure which has high stiffness for low internal and external deflections, and low weight and cost. The triangulated spaceframe mounts three points, in two axially spaced planes, on the turbofan gas turbine engine to three points on the aircraft structure. The ideal number of points to locate any structure in space is three, spaced as widely as possible for low reactions to couples. To be statically determinate six links should be distributed between the points connecting them to earth. Ideally these links are orthogonal and of minimum length.

We claim:

1. A mounting for coupling a turbofan gas turbine engine to an aircraft structure, the turbofan gas turbine engine having an axis and comprising a core engine and a fan, the core engine having compressor means, combustion means, turbine means and a core casing, the fan operating within a fan duct defined in part by a fan casing, the fan casing extending from a fan duct intake to a fan duct nozzle, the aircraft structure having three mounting points on the aircraft structure, the three mounting points being arranged at the vertices of a first triangle, the fan casing having three mounting points arranged at the vertices of a second triangle, support means connecting the three mounting points on the fan casing with the core casing to support the core engine, first connecting means connecting a first one of the mounting points on the aircraft structure with the three mounting points on the fan casing, second connecting means connecting a second one of the mounting points on the aircraft structure with two of the mounting points on the fan casing, and third connecting means connecting a third one of the mounting points on the aircraft structure with at least one of the mounting points on the fan casing;

said three mounting points on the aircraft structure being arranged in a first plane, said fan casing having a first mounting point in a second plane, the second plane being arranged perpendicular to the axis of the turbofan gas turbine engine, said fan casing having a second mounting point and a third mounting point in a third plane, said third plane being arranged perpendicular to the axis of the gas turbine engine, the third plane being spaced axially from the second plane, the second and third mounting points being angularly spaced on the fan casing such that the three mounting points on the fan casing are arranged at the vertices of the second triangle, the second connecting means connecting a second one of the mounting points on the aircraft structure with the second and third mounting points on the fan casing, the third connecting means connecting a third one of the mounting points on the aircraft structure with at least one of the second or third connecting points on the fan casing.

2. A mounting for coupling a turbofan gas turbine engine to an aircraft structure, the turbofan gas turbine engine having an axis and comprising a core engine and a fan, the core engine having compressor means, combustor means, turbine means and a core casing, the fan operating within a fan duct defined in part by a fan casing, the fan casing extending from a fan duct intake to a fan duct nozzle, the aircraft structure having three mounting points on the aircraft structure, the three mounting points being arranged at the vertices of a first triangle, the fan casing having three mounting points arranged at the vertices of a second triangle, support means connecting the three mounting points on the fan casing with the core casing to support the core engine, first connecting means connecting a first one of the mounting points on the aircraft structure with the three mounting points on the fan casing, second connecting means connecting a second one of the mounting points on the aircraft structure with two of the mounting points on the fan casing, and third connecting means connecting a third one of the mounting points on the aircraft structure with at least one of the mounting points on the fan casing;

the first connecting means comprising a first link connecting the first mounting point on the aircraft structure with the first mounting point on the fan casing, a second link connecting the first mounting point on the aircraft structure with the second mounting point on the fan casing and a third link connecting the first mounting point on the aircraft structure with the third mounting point on the fan casing, and wherein the first link comprises means to control the length of the first link to vary the pitch angle of the turbofan gas turbine engine relative to the aircraft structure.

3. A mounting as claimed in claim 1 wherein the first plane contains the axis of the turbofan gas turbine engine, the first mounting point is arranged in the first plane, the second and third mounting points are angularly spaced on either side of the first plane.

4. A mounting as claimed in claim 1 wherein the third plane is arranged axially downstream of the second plane.

5. A mounting as claimed in claim 1 wherein the first connecting means comprises a first link connecting the first mounting point on the aircraft structure with the first mounting point on the fan casing, a second link connecting the first mounting point on the aircraft structure with the second mounting point on the fan casing and a third link connecting the first mounting point on the aircraft structure with the third mounting point on the fan casing.

6. A mounting as claimed in claim 5 wherein the second connecting means comprises a fourth link connecting the second mounting point on the aircraft structure with the second mounting point on the fan casing and a fifth link connecting the second mounting point on the aircraft structure with the third mounting point on the fan casing.

7. A mounting as claimed in claim 6 wherein the third connecting means comprises a sixth link connecting the third mounting point on the aircraft structure with the second mounting point on the fan casing.

8. A mounting as claimed in claim 7 wherein the third connecting means comprises a seventh link connecting the third mounting point on the aircraft structure with the third mounting point on the fan casing.

9. A mounting as claimed in claim 8 wherein the third connecting means comprises an additional link connecting the third mounting point on the aircraft structure with the first mounting point on the fan casing.

10. A mounting as claimed in claim 6 wherein the second mounting point on the aircraft structure is connected to the aircraft structure by two links.

11. A mounting as claimed in claim 10 wherein the said two links are integral with the fourth and fifth links.

12. A mounting as claimed in claim 1 wherein the fan casing has a fourth point and a fifth point arranged in the second plane, the first mounting point, the fourth point and the fifth point are angularly spaced apart on the fan casing at the vertices of a third triangle, the fan casing has a sixth point arranged in the third plane, the second mounting point, the third mounting point and the sixth point are angularly spaced apart on the fan casing at the vertices of a fourth triangle, fourth connecting means connecting the first mounting point with the second mounting point and the third mounting point, fifth connecting means connecting the fourth point with the third mounting point and the sixth point, sixth connecting means connecting the fifth point with the second mounting point and the sixth point.

13. A mounting as claimed in claim 12 wherein the fourth connecting means comprises an eighth link connecting the first mounting point with the second mounting point and a ninth link connecting the first mounting point with the third mounting point.

14. A mounting as claimed in claim 12 wherein the fifth connecting means comprises a tenth link connecting the fourth point with the third mounting point and an eleventh link connecting the fourth point with the sixth point.

15. A mounting as claimed in claim 12, wherein the sixth connecting means comprises a twelfth link connecting the fifth point with the second mounting point and a thirteenth link connects the fifth point with the sixth point.

16. A mounting as claimed in claim 12 wherein the first mounting point, the fourth point and the fifth point are spaced apart by 120° to form an equilateral triangle.

17. A mounting as claimed in claim 12 wherein the second mounting point, the third mounting point and the sixth point are spaced apart by 120° to form an equilateral triangle.

18. A mounting as claimed in claim 17 wherein the points in the second plane are angularly rotated by 60° relative to the points in the third plane.

19. A mounting as claimed in claim 12 wherein the core casing has three points arranged at the vertices of a triangle in the third plane, a first one of the three points on the core casing is connected to the second mounting point and the third mounting point, a second one of the three points is connected to the third mounting point and the sixth point, a third one of the three points is connected to the second mounting point and the sixth point.

20. A mounting as claimed in claim 5 wherein the first link comprises means to control the length of the first link to vary the pitch angle of the turbofan gas turbine engine relative to the aircraft structure.

21. A mounting as claimed in claim 20 wherein the means to control the length of the first link is selected from the group comprising a hydraulic ram, an electric ram and a pneumatic ram.

22. A mounting as claimed in claim 6 wherein the fourth link comprises means to control the length of the fourth link to vary the yaw angle of the turbofan gas turbine engine relative to the aircraft structure.

23. A mounting as claimed in claim 22 wherein the means to control the length of the fourth link is selected from the group comprising a hydraulic ram, an electric ram and a pneumatic ram.

24. A mounting as claimed in claim 13 wherein the eighth link, the ninth link, the tenth link, the eleventh link, the twelfth link and the thirteenth link each comprise means to control the length of the respective link to rotate, or translate, an upstream portion of the fan casing to vary tip clearance between the fan and the fan casing.

25. A mounting as claimed in claim 24 wherein each of the the means to control the length of the links is selected from the group comprising a hydraulic ram, an electric ram and a pneumatic ram.

26. A mounting as claimed in claim 13 wherein each of the links comprises a hollow tube.

27. A mounting as claimed in claim 26 wherein each hollow tube comprises a plurality of fibres braided and arranged in a matrix material.

28. A mounting as claimed in claim 27 wherein the fibres are carbon fibres.

29. A mounting as claimed in claim 26 wherein each hollow tube comprises a metal matrix composite tube.

30. A mounting as claimed in claim 1 wherein the support means comprises a plurality of radially extending spokes arranged in the second plane connecting the first mounting point on the fan casing and the core casing and a plurality of A-frames arranged in the third plane connecting the second and third mounting points on the fan casing and the core casing.

31. A mounting for coupling a turbofan gas turbine engine to an aircraft structure, the turbofan gas turbine engine having an axis and comprising a core engine and a fan, the core engine having compressor means, combustor means, turbine means and a core casing, the fan operating within a fan duct defined in part by a fan casing, the fan casing extending from a fan duct intake to a fan duct nozzle, the aircraft structure having three mounting points on the aircraft structure, the three mounting points being arranged at the vertices of a first triangle, the fan casing having three mounting points arranged at the vertices of a second triangle, support means connecting the three mounting points on the fan casing with the core casing to support the core engine, first connecting means connecting a first one of the mounting points on the aircraft structure with the three mounting points on the fan casing, second connecting means connecting a second one of the mounting points on the aircraft structure with two of the mounting points on the fan casing, and third connecting means connecting a third one of the mounting points on the aircraft structure with at least one of the mounting points on the fan casing, at least some of said connecting means including first and second links connected by length controlling means operable to vary the length of said respective connecting means so as to vary the position of a portion of the fan casing to vary the tip clearance between the fan and the fan casing.

* * * * *